United States Patent Office 3,206,454
Patented Sept. 14, 1965

3,206,454
MONOAZO DYESTUFFS CONTAINING AN AMINO-SULFONYLDIALKYLAMINO RADICAL
Ernest Merian, Bottmingen, Basel-Land, Switzerland, Bruno J. R. Nicolaus, Milan, Italy, and Otto Senn, Arlesheim, Basel-Land, and Walter Wehrli, Riehen, Basel, Switzerland, assignors to Sandoz Ltd., also known as Sandoz A.G., Basel, Switzerland
No Drawing. Filed June 12, 1963, Ser. No. 287,224
Claims priority, application Switzerland, Aug. 13, 1959, 76,919
4 Claims. (Cl. 260—205)

This application is a continuation-in-part of application Serial No. 48,831, filed August 11, 1960, now United States Patent No. 3,134,766.

This invention relates to new monoazo dyestuffs which are of low water-solubility and which correspond to the general formula

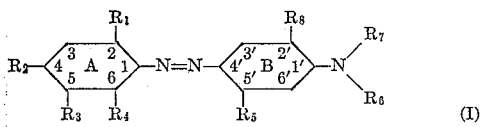

(I)

In this formula $R_1$ represents H, lower alkyl, lower alkoxy, cyano, nitro, Cl or Br,
$R_2$ represents H, lower alkyl, lower alkoxy, nitro, Cl, Br, lower alkanoylamino, lower carbalkoxy, lower carbalkoxyamino, lower alkylsulfonyl, aminosulfonyl, or lower aminoalkylsulfonyl,
$R_3$ represents H, nitro or Cl,
$R_4$ represents H, nitro, Cl or Br,
$R_5$ represents H, lower alkyl, lower alkoxy, Cl, lower alkanoylamino or lower carbalkoxyamino,
$R_6$ represents di-(lower alkyl)-aminosulfonylaminoethyl,
$R_7$ represents lower alkyl, chloroethyl, difluoroethyl, lower alkoxyethyl, lower alkanoyloxyethyl or cyanoethyl, and
$R_8$ represents H, lower alkyl, lower alkoxy or trifluoromethyl, at least one of the symbols $R_3$ and $R_4$ being H.

Examples for "lower alkyl" named under $R_1$, $R_4$, $R_5$, $R_7$ and $R_8$ are methyl, ethyl, propyl, and butyl, for "lower alkoxy" named under $R_1$, $R_5$, $R_7$ and $R_8$ methoxy, ethoxy, propoxy and butoxy, for "lower alkanoylamino" named under $R_2$ and $R_5$ acetylamino and propionylamino, for "lower carbalkoxy" named under $R_2$ carbomethoxy and carbethoxy, for "lower carbalkoxyamino" named under $R_2$ and $R_5$ carbomethoxyamino, carbethoxyamino, carbopropoxyamino and carbobutoxyamino, for "lower alkylsulfonyl" named under $R_2$ methylsulfonyl and ethylsulfonyl, for "lower alkylaminosulfonyl" named under $R_2$ methylaminosulfonyl and ethylaminosulfonyl, for "lower alkoxyethyl" named under $R_7$ methoxyethyl and ethoxyethyl, and for "lower alkanoyloxyethyl" named under $R_7$ acetoxyethyl, propionyloxyethyl and butyryloxyethyl. Di-(lower alkyl)-aminosulfonylamino means for example di-(methyl)-, di-(ethyl)-, di-(propyl)- and di-(butyl)-aminosulfonylamino and di-(lower alkyl)-aminosulfonylamino ethyl means for example di-(methyl)-, di-(ethyl)-, di-(propyl)- and di-(butyl)-aminosulfonylamino ethyl.

The term "lower" means that the groups designated thereby contain no more than 4 carbon atoms and preferably 1 to 2 carbon atoms.

If the nucleus A contains nitro groups or (lower) alkoxy groups, it contains preferably no more than 2 nitro groups or 2 lower alkoxy groups.

The process for the production of the dyestuffs corresponding to the Formula I comprising coupling a diazotized amine of the general formula

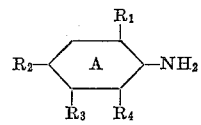

(II)

with a compound of the general formula

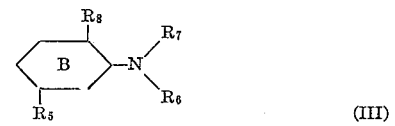

(III)

the coupling reaction being effected preferably at pH values below 7.0, and in a mineral acid or weakly acid solution.

The new monoazo dyestuffs of low water-solubility dye from aqueous dispersion synthetic polyamide fibers such as nylon and Perlon (registered trademark); cellulose ester fibers, e.g. secondary cellulose acetate and triacetate; polyvinyl fibers; acrylic and modified acrylic fibers, especially polyacrylonitrile fibers, polyester fibers, preferably terephthalic acid ester fibers such as Terylene, Dacron, Dacron 64, Kodel and Vycron (registered trademarks) in yellow or orange shades. The dyestuffs can also be applied to the same fibers by padding or printing techniques. They have good building-up properties on these fibers. The dyeings and prints possess very good fastness to light, gas fumes, washing heat-setting, pleating, sublimation, perspiration, water and sea water, and are dischargeable. A fairly good reserve of viscose rayon, cotton and wool is obtained, especially on aftertreatment with a hydrosulfite. The new dyestuffs are also suitable for coloring lacquers, oils, plastics and artificial fibers in the mass. Cellulose acetate and triacetate dyed in the dope with these dyestuffs have high fastness to light, washing, perspiration, gas fumes, cross dyeing. alkaline bleaching, oxalic acid, dry cleaning and peroxide bleaching, and excellent fastness to water, sea water, soap baths, crocking, decatizing and pressing.

In the following examples the parts and percentages are by weight and the temperatures in degrees centigrade.

EXAMPLE 1

21.5 parts of 1-amino-3-dimethylamino-sulfonylaminobenzene are stirred into 100 parts of water and 36 parts of concentrated hydrochloric acid. Ice is added to cool to 0°, then a 20% solution of 6.9 parts of sodium nitrite is added. The solution of the diazo compound is run with vigorous stirring into a solution of 15 parts of N,N-diethylaminobenzene in 100 parts of water and 12 parts of concentrated hydrochloric acid. A solution of 15 parts of sodium acetate in 100 parts of water is added dropwise until the diazo compound has disappeared. The precipitated dye is filtered off, washed neutral and dried. It dyes acetate, triacetate, synthetic polyamide and polyester fibers from fine aqueous dispersion in orange shades of good fastness to light, washing, water, heat setting and pressing.

In the following table further monoazo dyestuffs of the Formula I are recited which can be produced in an analogous manner as described in Example 1 and which are suitable for dyeing artificial fibers such as acetate, triacetate, polyester and synthetic polyamide fibers.

Table

| Example No. | R₁ | R₂ | R₃ | R₄ | R₅ | R₆ | R₇ | R₈ | |
|---|---|---|---|---|---|---|---|---|---|
| 2 | H | H | (CH₃)₂N—SO₂—NH— | H | H | (CH₃)₂N—SO₂—NH—C₂H₄— | C₂H₅ | H | Orange. |
| 3 | Br | H | H | H | H | (C₂H₅)₂N—SO₂—NH—C₂H₄— | C₂H₅ | H | Do. |
| 4 | CH₃ | Cl | H | H | CH₃ | (CH₃)₂N—SO₂—NH—C₂H₄— | C₂H₅ | H | Pink. |
| 5 | NO₂ | CH₃ | H | H | H | (CH₃)₂N—SO₂—NH—C₂H₄— | C₂H₅ | H | Do. |
| 6 | NO₂ | CH₃ | H | H | C₂H₅ | (CH₃)₂N—SO₂—NH—C₂H₄— | C₂H₅ | H | Do. |
| 7 | Cl | C₂H₅ | H | H | CH₃ | (CH₃)₂N—SO₂—NH—C₂H₄— | C₂H₅ | H | Orange. |
| 8 | Cl | CH₃—NH—SO₂— | H | H | H | (CH₃)₂N—SO₂—NH—C₂H₄— | C₂H₅ | H | Do. |
| 9 | Cl | C₂H₅—NH—SO₂— | H | H | H | (CH₃)₂N—SO₂—NH—C₂H₄— | C₂H₅ | H | Do. |
| 10 | Cl | Cl | H | H | H | (CH₃)₂N—SO₂—NH—C₂H₄— | C₂H₅ | H | Do. |
| 11 | Cl | H | Cl | H | H | (CH₃)₂N—SO₂—NH—C₂H₄— | C₂H₅ | H | Do. |
| 12 | Cl | Cl | Cl | H | H | (CH₃)₂N—SO₂—NH—C₂H₄— | C₂H₅ | H | Do. |
| 13 | Cl | CH₃O—OC— | H | H | H | (CH₃)₂N—SO₂—NH—C₂H₄— | C₂H₅ | H | Do. |
| 14 | H | C₂H₅O—OC— | H | H | H | (CH₃)₂N—SO₂—NH—C₂H₄— | C₂H₅ | H | Pink. |
| 15 | H | Cl | NO₂ | H | H | (CH₃)₂N—SO₂—NH—C₂H₄— | C₂H₅ | H | Orange. |
| 16 | H | C₂H₅O—CO—HN— | H | H | H | (CH₃)₂N—SO₂—NH—C₂H₄— | C₂H₅ | H | Do. |
| 17 | H | C₂H₅O—CO—HN— | H | H | H | (CH₃)₂N—SO₂—NH—C₂H₄— | C₂H₅ | H | Do. |
| 18 | H | CH₃—O—OC— | H | H | H | (CH₃)₂N—SO₂—NH—C₂H₄— | C₂H₅ | H | Do. |
| 19 | Cl | H₂N—SO₂— | H | Br | H | (CH₃)₂N—SO₂—NH—C₂H₄— | C₂H₅ | H | Red. |
| 20 | CH₃O | H | H | H | H | (CH₃)₂N—SO₂—NH—C₂H₄— | C₂H₅ | H | Orange. |
| 21 | H | H | NO₂ | H | H | (CH₃)₂N—SO₂—NH—C₂H₄— | C₂H₅ | H | Pink. |
| 22 | Br | NO₂ | H | H | H | (CH₃)₂N—SO₂—NH—C₂H₄— | C₂H₅ | H | Red. |
| 23 | NO₂ | CH₃O | H | H | H | (CH₃)₂N—SO₂—NH—C₂H₄— | C₂H₅ | H | Do. |
| 24 | H | CH₃—CO—HN— | H | H | H | (CH₃)₂N—SO₂—NH—C₂H₄— | C₂H₅ | H | Orange. |
| 25 | H | C₂H₅—CO—HN— | H | H | H | (CH₃)₂N—SO₂—NH—C₂H₄— | C₂H₅ | H | Do. |
| 26 | Cl | C₂H₅—SO₂— | H | H | Cl | (CH₃)₂N—SO₂—NH—C₂H₄— | C₂H₅ | H | Do. |
| 27 | Cl | CH₃—SO₂— | H | H | Cl | (CH₃)₂N—SO₂—NH—C₂H₄— | C₂H₅ | H | Do. |
| 28 | Cl | C₂H₅—SO₂— | H | H | Cl | (CH₃)₂N—SO₂—NH—C₂H₄— | C₂H₅ | H | Do. |
| 29 | H | NO₂ | H | Cl | Cl | (CH₃)₂N—SO₂—NH—C₂H₄— | C₂H₅ | H | Do. |
| 30 | H | NO₂ | H | H | C₂H₅—CO—NH— | (CH₃)₂N—SO₂—NH—C₂H₄— | C₂H₅ | H | Scarlet. |
| 31 | Cl | NO₂ | H | H | CH₃—CO—NH— | (CH₃)₂N—SO₂—NH—C₂H₄— | C₂H₅ | H | Ruby. |
| 32 | Br | NO₂ | H | H | C₂H₅—CO—NH— | (CH₃)₂N—SO₂—NH—C₂H₄— | C₂H₅ | H | Blue. |
| 33 | CN | NO₂ | H | H | CH₃—CO—NH— | (CH₃)₂N—SO₂—NH—C₂H₄— | CH₃ | C₂H₅O | Violet. |
| 34 | CH₃O | NO₂ | H | H | H | (CH₃)₂N—SO₂—NH—C₂H₄— | Cl—C₂H₄— | CH₃O | Blue. |
| 35 | NO₂ | NO₂ | H | H | H | (CH₃)₂N—SO₂—NH—C₂H₄— | CH₃O—C₂H₄— | CH₃O | Brown. |
| 36 | CN | NO₂ | H | Cl | Cl | (CH₃)₂N—SO₂—NH—C₂H₄— | CN—C₂H₄— | H | Orange. |
| 37 | CN | CH₃—SO₂— | Cl | H | Cl | (CH₃)₂N—SO₂—NH—C₂H₄— | CH₃—CO—O—C₂H₄— | H | Scarlet. |
| 38 | Cl | (CH₃)₂N—SO₂— | H | H | H | (CH₃)₂N—SO₂—NH—C₂H₄— | CH₃—CO—O—C₂H₄— | H | Do. |
| 39 | Cl | (C₂H₅)₂N—SO₂— | Cl | H | H | (CH₃)₂N—SO₂—NH—C₂H₄— | CH₃ | H | Scarlet. |
| 40 | Cl | NO₂ | H | H | H | (CH₃)₂N—SO₂—NH—C₂H₄— | C₂H₅ | CF₃ | Do. |
| 41 | Cl | H | H | H | H | (CH₃)₂N—SO₂—NH—C₂H₄— | C₂H₅ | H | Do. |
| 42 | Cl | NO₂ | H | H | H | (CH₃)₂N—SO₂—NH—CH—CH₂—<br>　　　　　　　　　　CH₃ | C₃H₇ | H | Do. |
| 43 | Cl | NO₂ | H | H | CH₃O | (CH₃)₂N—SO₂—NH—C₂H₄— | C₂H₅ | C₂H₅ | Red. |
| 44 | Cl | NO₂ | H | H | H | (CH₃)₂N—SO₂—NH—C₂H₄— | C₂H₅ | C₂H₅ | Scarlet. |
| 45 | Cl | NO₂ | H | H | C₂H₅O— | (CH₃)₂N—SO₂—NH—C₂H₄— | CF₃— | CH₃ | Red. |
| 46 | Cl | NO₂ | H | H | C₂H₅O—CO—NH— | (CH₃)₂N—SO₂—NH—C₂H₄— | C₂H₅—O—C₂H₄— | H | Do. |
| 47 | Cl | NO₂ | H | H | C₂H₅O—CO—NH— | (CH₃)₂N—SO₂—NH—C₂H₄— | C₂H₅ | H | Do. |
| 48 | Cl | NO₂ | H | H | C₃H₇O—CO—NH— | (CH₃)₂N—SO₂—NH—C₂H₄— | C₂H₅ | H | Do. |

EXAMPLE 49

20.5 parts of 1-amino-2-chloro-4-methylsulfonylbenzene are diazotized with nitrosyl sulfuric acid in the normal way. The sulfuric acid solution is poured on to ice and mixed with a mineral acid solution of 27.1 parts of N - [2' - dimethylaminosulfonylamino] - ethyl - N-ethylaminobenzene. By neutralizing the mineral acid, the coupling reaction is accelerated. The dyestuff thus formed separates with an orange-red color. It can be recrystallized from acetone and melts at 130–131°. It dyes synthetic polyamide fibers in orange shades. A very similar dyestuff is obtained when 28.5 parts of 1-N-[2'-dimethylaminosulfonylamino] - ethyl - N - ethylamino-3-methylbenzene are used as coupling component.

Having thus disclosed the invention what we claim is:

1. Monoazo dyestuff of low water-solubility, of the formula

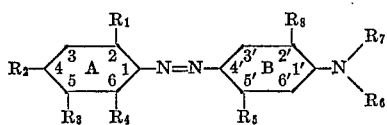

wherein
$R_1$ is a member selected from the group consisting of H, lower alkyl, lower alkoxy, cyano, nitro, Cl and Br,
$R_2$ is a member selected from the group consisting of H, lower alkyl, lower alkoxy, nitro, Cl, Br, lower alkanoylamino, lower carbalkoxy, lower carbalkoxyamino, lower alkylsulfonyl, aminosulfonyl and lower aminoalkylsulfonyl,
$R_3$ is a member selected from the group consisting of H, nitro and Cl,
$R_4$ is a member selected from the group consisting of H, nitro, Cl and Br,
$R_5$ is a member selected from the group consisting of H, lower alkyl, lower alkoxy, Cl, lower alkanoyl amino and lower carbalkoxyamino,
$R_6$ is di-(lower alkyl)-aminosulfonylaminoethyl,
$R_7$ is a member selected from the group consisting of lower alkyl, chloroethyl, difluoroethyl, lower alkoxy ethyl, lower alkanoyloxyethyl and cyanoethyl, and
$R_8$ is a member selected from the group consisting of H, lower alkyl, lower alkoxy and trifluoromethyl, at least one of $R_3$ and $R_4$ being H, and the nucleus A containing at most two lower alkoxy groups and at most two nitro groups.

2. The dyestuff of the formula

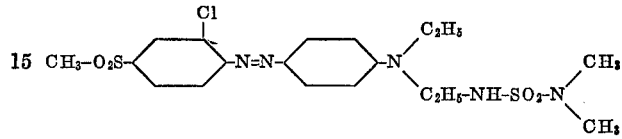

3. The dyestuff of the formula

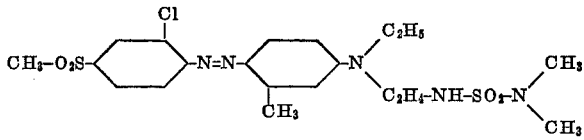

4. The dyestuff of the formula

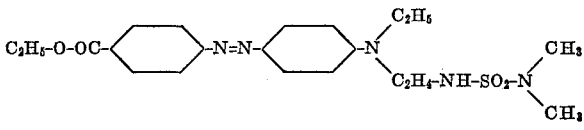

References Cited by the Examiner

UNITED STATES PATENTS 2,909,515 10/59 Ruckstuhl _____ 260—199 X
3,050,616 8/62 Merian et al _____ 260—206 X CHARLES B. PARKER, *Primary Examiner.*